(12) United States Patent
Liu

(10) Patent No.: US 8,400,794 B2
(45) Date of Patent: Mar. 19, 2013

(54) POWER SYSTEM

(76) Inventor: Ching Hsiung Liu, Tainan (TW)

( * ) Notice: Subject to any disclaimer, the term of this patent is extended or adjusted under 35 U.S.C. 154(b) by 444 days.

(21) Appl. No.: 12/679,904

(22) PCT Filed: Oct. 2, 2007

(86) PCT No.: PCT/IB2007/054005
§ 371 (c)(1),
(2), (4) Date: Jul. 6, 2010

(87) PCT Pub. No.: WO2009/044231
PCT Pub. Date: Apr. 9, 2009

(65) Prior Publication Data
US 2010/0277140 A1    Nov. 4, 2010

(51) Int. Cl.
*H02J 1/10* (2006.01)
*G05F 5/00* (2006.01)

(52) U.S. Cl. ............... 363/65; 323/272; 323/299

(58) Field of Classification Search ........... 363/65; 323/225, 271, 272, 282, 299, 350
See application file for complete search history.

(56) References Cited

U.S. PATENT DOCUMENTS

| | | | |
|---|---|---|---|
| 6,009,000 A * | 12/1999 | Siri | 363/21.09 |
| 6,177,783 B1 * | 1/2001 | Donohue | 323/272 |
| 6,664,659 B1 * | 12/2003 | Adi | 307/64 |
| 7,038,924 B2 * | 5/2006 | Wu | 363/89 |
| 7,724,552 B2 * | 5/2010 | Itakura et al. | 363/65 |

* cited by examiner

Primary Examiner — Gary L Laxton

(57) ABSTRACT

A power system is disclosed. The power system comprises a plurality of power supply units, a voltage sharing bus, and a current sharing bus. The sharing bus is used to transmit a sharing voltage, and the current sharing bus is used to transmit a first current reference value. Each of the power supply units comprises: a power converter, a feed-forward control (FFC) circuit, and a feedback control (FBC) circuit. The feed-forward control circuit is used to generate a second current reference value according to a difference between an input voltage of the power converter and the sharing voltage. The feedback control circuit is used to generate a current compensation value according to the second current reference value and the first current reference value. The power converter can adjusts the output current thereof in accordance with the current compensation value.

36 Claims, 13 Drawing Sheets

POWER SYSTEM

TECHNICAL FIELD

This invention relates to a power system, and more particularly, to a power system with sharing control and feed-forward control.

BACKGROUND ART

Recently, the characteristics of power electronic devices have been improved significantly. Power electronic devices with high-voltage rating, high-current rating, and high switching speeds have been developed due to the improvement of semiconductor manufacturing techniques. Power electronic devices are applied in electric power equipment, such as switching power supplies, uninterruptible power supplies, motor drivers, arc furnaces, trolley cars, battery chargers, lighting appliances etc. For example, converters are well known in the field of electronics, such as DC-to-DC, DC-to-AC, AC-to-DC or AC-to-AC converters. Such circuitry or devices are typically employed to convert one DC or AC voltage to another DC or AC voltage.

Typically, there are several kinds of power systems using the converters, such as a central power system (CPS) or a distributed power system (DPS). Referring to FIG. 1, FIG. 1 is a system block diagram showing a conventional central power system. In a central power system 10, a single input power source 11 is electrically connected to a power converter 12 and then to a plurality of loadings ($R_L$) 13 (such as electronic devices). For example, the input power source 11 may be a DC power source, and the power converter 12 is employed to convert one DC voltage level to another DC voltage level. Therefore, the input power source 11 can supply power to the loadings 13. However, there are some disadvantages in the conventional central power system, such as high current stress on devices, poor reliability and difficulty in power maintenance, etc.

Referring to FIG. 2, FIG. 2 is a system block diagram showing a conventional distributed power system. In the distributed power system, a single input power source 21 is electrically connected to a plurality of DC-to-DC converters 22 and to a plurality of loadings ($R_{L1}$, $R_{L2}$, $R_{L3}$) 23 (such as electronic devices), wherein the DC-to-DC converters 22 are electrically connected to the respective loadings 23, thereby supplying power to the loadings 23. Although there are some advantages in the conventional distributed power system, such as lower current stress on devices, supporting of N+1 redundancy, ease maintenance and customization with standardized module etc., yet when the single input power source 21 is broken-down or fails to supply power, the whole distributed power system would be useless.

DISCLOSURE OF INVENTION

Disclosure

Therefore, an aspect of the present invention is to provide a power system to feed-forward control the paralleling converters, thereby self-regulating the output status of each of the power sources.

Another aspect of the present invention is to provide a power system with a plurality of power sources and a plurality of converters electrically connected thereto respectively in a one-to-one manner, thereby allowing each of the power sources to be replaceable.

According to an embodiment of the present invention, the power system comprises a voltage sharing bus and a plurality of power supply units. The power supply units are electrically connected in parallel and used to provide power to a loading, wherein each of the power supply units is electrically connected to the voltage sharing bus to receive a sharing voltage transmitted by the voltage sharing bus, and comprises: a power converter, a resistor, a first comparator, a current detector, and a second comparator. The power converter is electrically connected to a power source and the load. The resistor is electrically connected to an input terminal of the power converter. The first comparator is used to generate a current reference value in accordance with the difference between the sharing voltage and an input voltage of the power converter, wherein the first comparator is electrically connected to the resistor and the input terminal, and one end of the voltage sharing bus is electrically connected between the resistor and the first comparator. The current detector is used to detect an output current value of the power converter. The second comparator is used to generate the current compensation value in reference value thus that the power converter adjusts the output current value thereof in accordance with the current compensation value.

According to another embodiment of the present invention, the power system comprises a voltage sharing bus, a current sharing bus, and a plurality of power supply units. The power supply units are electrically connected in parallel and used to provide power to a loading, wherein the power supply units are electrically connected to the voltage sharing bus to receive a sharing voltage transmitted by the voltage sharing bus and electrically connected to the current sharing bus to receive a first current reference value transmitted by the current sharing bus, and each of the power supply units comprises a power converter, a feed-forward control (FFC) circuit, and a feedback control (FBC) circuit. The power converter is electrically connected to a power source and the loading. The feed-forward control circuit is used to generate a second current reference value in accordance with the difference between the sharing voltage and an input voltage of the power converter, wherein one end of the voltage sharing bus is electrically connected to the feed-forward control circuit. The feedback control circuit is used to generate a current compensation value in accordance with the first current reference value and the second current reference value, wherein one end of the current sharing bus is electrically connected to the feedback control circuit. The power converter adjusts an output current value thereof in accordance with the current compensation value.

According to a further embodiment of the present invention, the power system comprises a voltage sharing bus, a current sharing bus, a master power supply unit, and at least a slave power supply unit. The voltage sharing bus is used to transmit a sharing voltage. The current sharing bus is used to transmit a first current reference value. The master power supply unit is used to provide power to a loading and provide the first current reference value. The at least one slave power supply unit are electrically connected in parallel with the master power supply unit and used to provide power to the at least one loading. The master power supply unit comprise a first power converter, a first feed-forward control circuit, and a first feedback control circuit. The first power converter is electrically connected to a first power source and the loading. The first feed-forward control circuit is used to generate a second current reference value in accordance with the difference between the sharing voltage and a first input voltage of the power converter. The first feedback control circuit is used to generate the first current reference value, and generate a first current compensation value in accordance with a first output voltage of the first converter and the second current reference value. Then the first power converter adjusts a first output current value thereof in accordance with the first current compensation value. Each of the slave power supply units comprises a second power converter, a second feed-forward control circuit, and a second feedback control circuit. The second power converter is electrically connected to a second power source and the loading. The second feed-forward control circuit is used to generate a third current reference value in accordance with the difference between the sharing voltage and a second input voltage of the second power converter. The second feedback control circuit is used to generate a second current compensation value in accordance with the first current reference value and the third current reference value. The second power converter adjusts a second output current value thereof in accordance with the second current compensation value.

According to a further embodiment of the present invention, the power system comprises a voltage sharing bus, a first power supply unit, and a second power supply. The voltage sharing bus is used to transmit a sharing voltage. The first power supply unit is used to provide power to a loading. The second power supply unit is used to provide power to the loading and electrically connected in parallel with the first power supply. The first power supply comprises a first power converter, a first resistor, and a first comparator. The first power converter is electrically connected to a first power source and the loading, wherein the first power converter comprises a first current output terminal and a first voltage reverence terminal, and the first current output terminal is electrically connected to the loading. The first resistor is electrically connected to a first input terminal of the first power converter. The first comparator is used to generate a first voltage compensation value in accordance with the difference between the sharing voltage and a first input voltage of the first power converter, wherein the first comparator is electrically connected to the second resistor and the input terminal, and one end of the voltage sharing bus is electrically connected between the first resistor and the first comparator. The first power converter adjusts a first output voltage thereof in accordance with the first voltage compensation value. The second power supply unit comprises a second power converter, a second resistor, and a second comparator. The second power converter is electrically connected to a first power source and the loading, wherein the second power converter comprises a second current output terminal and a second voltage reverence terminal, the second current output terminal is electrically connected to the first voltage reference terminal. The second resistor is electrically connected to a second input terminal of the second power converter. The second comparator is used to generate a second voltage compensation value in accordance with the difference between the sharing voltage and a second input voltage of the second power converter, wherein the second comparator is electrically connected to the second resistor and the second input terminal, and another end of the voltage sharing bus is electrically connected between the second resistor and the second comparator. The second power converter adjusts a second output voltage thereof in accordance with the second voltage compensation value.

Therefore, with the application of the power system disclosed in the embodiments of the present invention, the converters are adapted to self-regulate the output current (or output voltage) supplied to the loading respectively according to the input status of each the power sources, thereby enhancing the power efficiency and life time of the power system.

DESCRIPTION OF DRAWINGS

The foregoing aspects and many of the attendant advantages of this invention will become more readily appreciated as the same becomes better understood by reference to the following detailed description, when taken in conjunction with the accompanying drawings, wherein.

BEST MODE

In order to make the illustration of the present invention more explicit and complete, the following description is stated with reference to FIG. 3 through FIG. 26.

Figure 3:
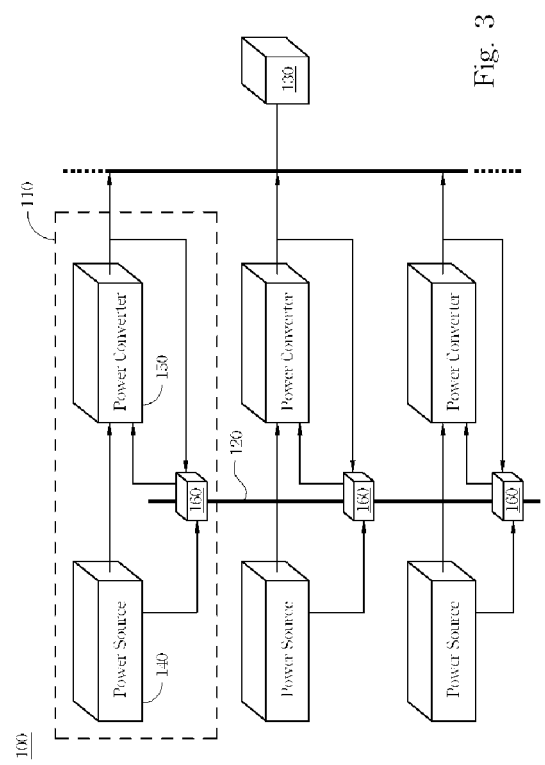
FIG. 3 is a system block diagram showing a power system according to a first embodiment of the present invention.

Referring to FIG. 3. FIG. 3 is a system block diagram showing a power system according to a first embodiment of the present invention. A power system 100 comprises a plurality of power supply units 110, a sharing bus 120 and at least one loading 130. Each of the power supply units 110 comprises a power source 140, a power converter 150, and a converter control circuit 160. The sharing bus 120 is electrically connected to the converter control circuit 160 of each of the power supply units 110 for sharing voltage signal, wherein the sharing bus 120 is a voltage sharing bus. The power source 140 of the power system 100 may be DC or AC power sources, such as manpower generators, solar cells, fuel cells, wind-power generators, thermal-power generators, water-power generators, conventional electric power generators or electric cell, to input a source voltage to the power converter 150, thereby supplying power to the loading 130 via the power converter 150. The power converter 150 may be DC-to-DC, DC-to-AC, AC-to-DC or AC-to-AC converter for converting the input voltage (DC or AC) to the output voltage (DC or AC). The loading 130 may be any device or apparatus actuated by electric power, such as a motor. Furthermore, a single loading 130 or more than two loadings 130 may be used in the power system 100.

Figure 2:
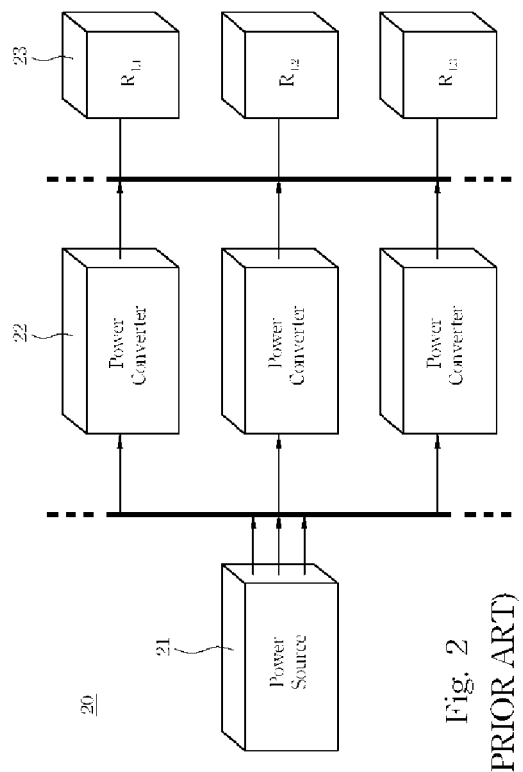
FIG. 2 is a system block diagram showing a conventional distributed power system.
Figure 1:
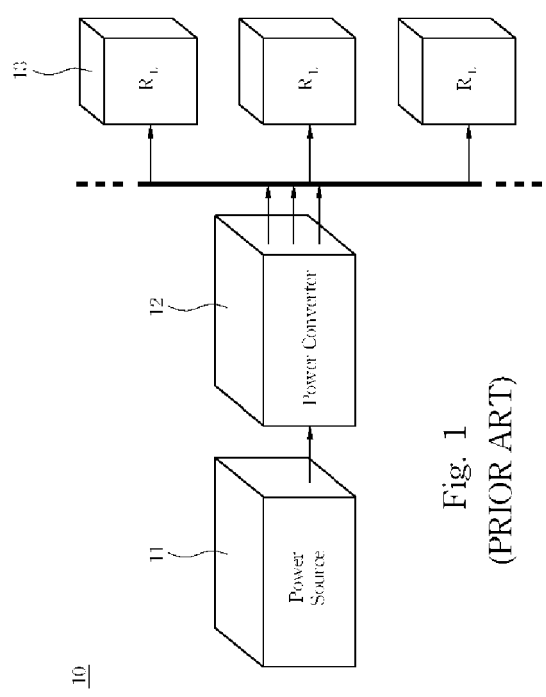
FIG. 1 is a system block diagram showing a conventional central power system.
Figure 4:
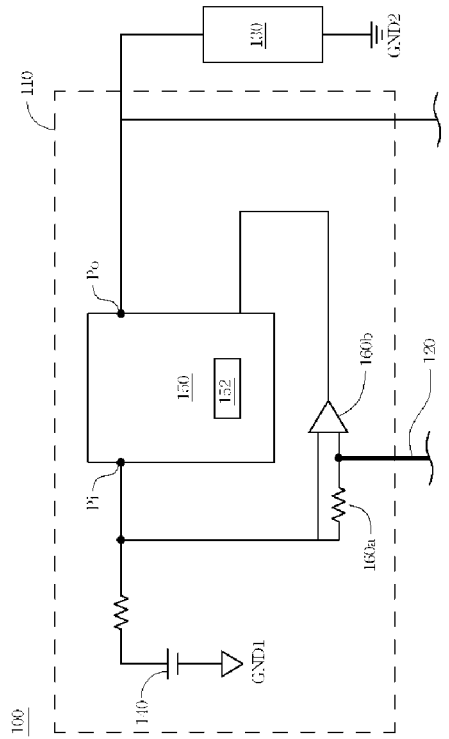
FIG. 4 is a circuit diagram power supply unit according to a first embodiment of the present invention.

Referring to FIG. 4. FIG. 4 is a circuit diagram showing one power supply unit 110 according to the first embodiment of the present invention. The converter control circuit 160 comprises a resistor 160a, and a first comparator 160b. The resistor 160a is electrically connected to the input terminal P, of the power converter 150 thus that the input voltage of the power converter 150 is inputted into the sharing bus 120 via the resistor 160a. One end of the sharing bus 120 is electrically connected between the resistor 160a and the first comparator 160b. The first comparator 160b is used to generate a current reference value in accordance with the difference between the input voltage of the power converter 150 and a sharing voltage. The sharing voltage is the average of the input voltages inputted into the sharing bus 120 multiplied by weighted values. The power converter 150 comprise a an another converter control circuit 152, wherein the converter control circuit 152 can adjust the output thereof in accordance with the current reference value. In addition, in this embodiment the first comparator 160b and the second comparator 160d are more prefer op amplifiers. The power converter of this invention may comprise electrical isolation elements (such as a transformer) or electrical non-isolation elements, thus that the ground voltage GND1 is not necessarily equal to the ground voltage GND2.

In view of the above description, the output current of the converter150 can follow the difference between the voltage provided by the power source 140 and the sharing voltage transmitted by the sharing bus 120.

Figure 5:
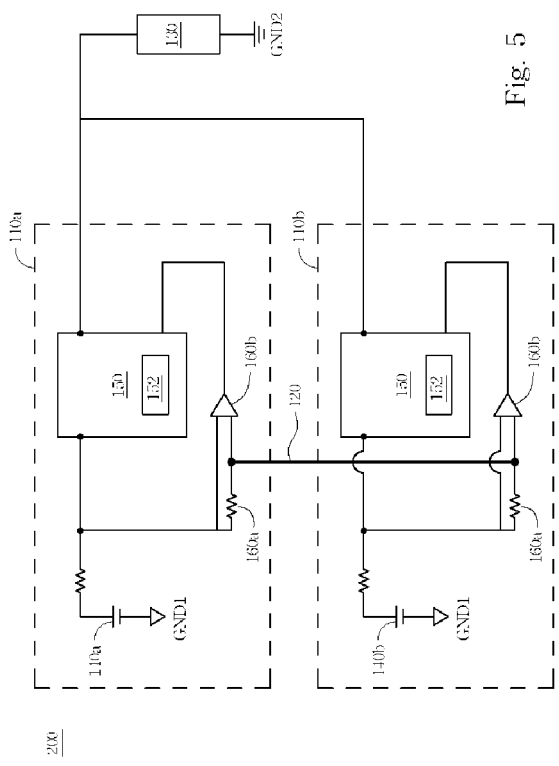
FIG. 5 is a circuit diagram showing one power system according to the first embodiment of the present invention.

Referring to FIG. 5. FIG. 5 is a circuit diagram showing a power system 200 according to the first embodiment of the present invention. The power system 200 is a specific example of the power system 100. The power system 200 comprises a power supply unit 110a, a power supply unit 110b, the sharing bus 120, and the loading 130, wherein the power supply unit 110a and power supply unit 110b is similar to the power supply unit 110. One end of the sharing bus 120 is electrically connected between the resistor 160a and the first comparator 160b of the power supply unit 110a, and another end of the sharing bus 120 is electrically connected between the resistor 160a and the first comparator 160b of the power supply unit 110b. In the power system 200, the power source 140a provides a first voltage, and the power source 140b provides a second voltage, wherein the first voltage is higher than the second voltage. When the first voltage (such as 48V) is higher than the second voltage (such as 38V), the power supply unit 110a can output more current than that outputted by the power supply unit 110b and keep the power supply unit 110b do not output the current value exceeding the limitation thereof so that the power supply unit 110b is protected thereby.

Figure 6:
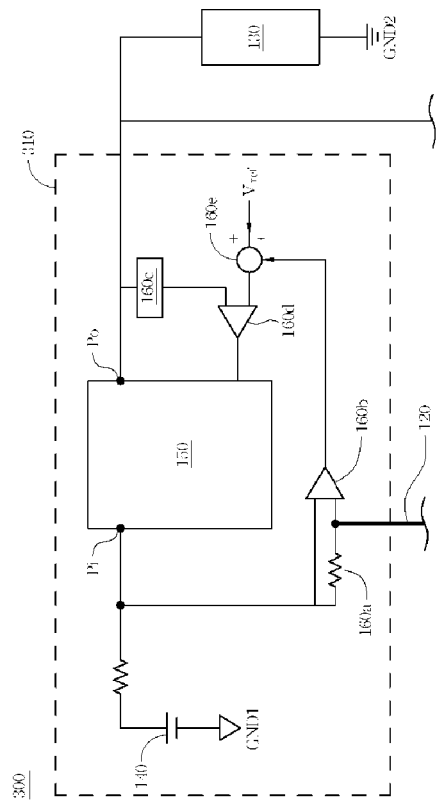
FIG. 6 is a circuit diagram showing one power supply unit of a power system according to the first embodiment of the present invention.

Referring to FIG. 6. FIG. 6 is a circuit diagram showing one power supply unit 310 of a power system 300 according to the first embodiment of the present invention. The power system 300 comprises a plurality of power supply units 310. One power supply unit 310 is similar to the power supply unit 110, but the difference is in that the power supply unit 310 further comprises a current detector 160c, a second comparator 160d, and an adder 160e. The current detector 160c is electrically connected to the output terminal Po of the power converter 150 to detect an output current value of the power converter 150. The adder 160e is used to calculate the sum of the voltage compensation value and a predetermined voltage Vref, wherein the predetermined voltage Vref is a comparing level. The second comparator 160d is used to generate a current compensation value in accordance with the difference between the sum and the output current value detected by the current detector 160c, and then the power converter 150 adjusts the output current thereof in accordance with the current compensation value.

Figure 8:
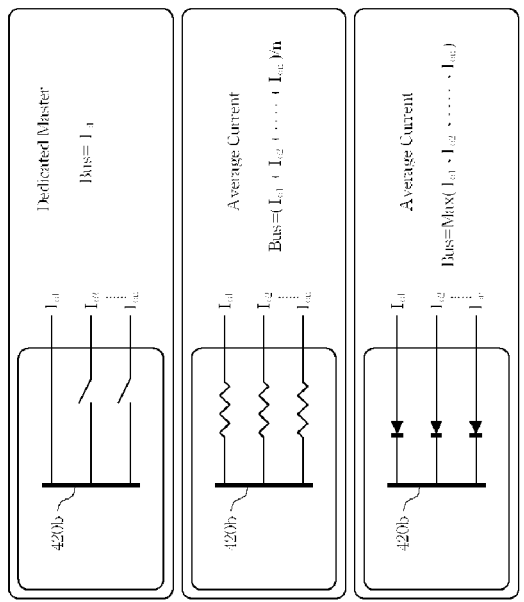
FIG. 8 shows several methods of using current sharing buses according to a second embodiment through a fifth embodiment of the present invention.
Figure 7:
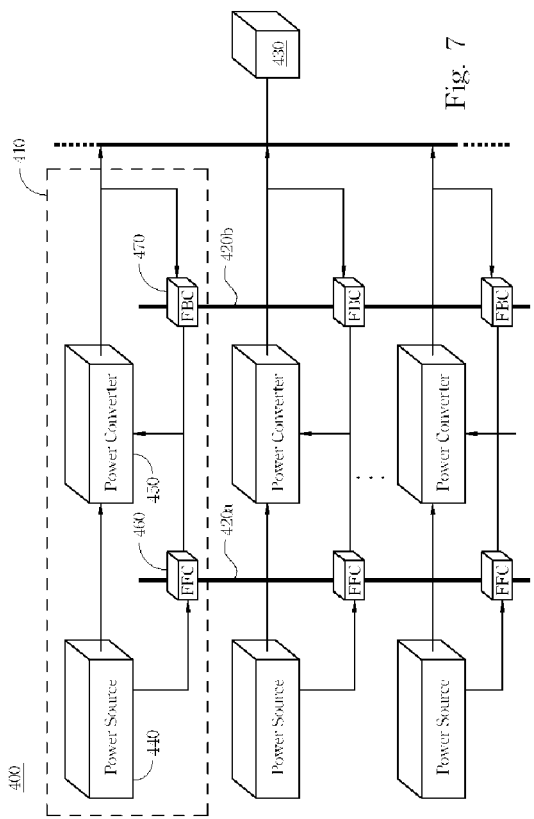
FIG. 7 is a system block diagram showing a power system according to a second embodiment through a fifth embodiment of the present invention.

Referring to FIG. 7 and FIG. 8, FIG. 7 is a system block diagram showing a power system 400 according to a second embodiment through a fifth embodiment of the present invention; and FIG. 8 shows several methods of using current sharing buses according to a second embodiment through a fifth embodiment of the present invention. The power system 400 comprises a plurality of power supply units 410, a voltage sharing bus 420a, a current sharing bus 420b, and at least one loading 430. Each of the power supply units 410 comprises a power source 440, a power converter 450, a feed-forward control (FFC) circuit 460, and a feedback control (FBC) circuit 470. The voltage sharing bus 420a is electrically connected to the FFC circuit 460 of each of the power supply units 410, and the current sharing bus 420b is electrically connected to the FBC circuit 470 of each of the power supply units 410.

The power source 440 may be DC or AC power sources, such as manpower generators, solar cells, fuel cells, wind-power generators, thermal-power generators, water-power generators, conventional electric power generators or electric cell, to input the input voltage to the power converter 450, thereby supplying power to the loading 430 via the power converter 450. The converters 450 may be DC-to-DC, DC-to-AC, AC-to-DC or AC-to-AC converter for converting the input voltage (DC or AC) to the output voltage (DC or AC). The loading 430 may be any device or apparatus actuated by electric power, such as a motor. Furthermore, a single loading or more than two loadings may be used in the power system 400.

In accordance with the second embodiment, the current sharing bus 420b may be connected by using the method such as dedicated master (DM) method, average current (AC) method, automatic master (AM) method or other suitable method, and the sharing control method may be an inner loop regulation (ILR), an outer loop regulation (OLR), a dual loop regulation (DLR), a single loop regulation (SLR) or other suitable method.

Figure 9:
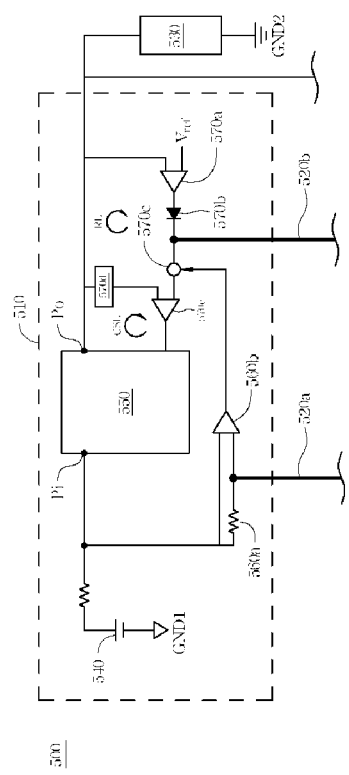
FIG. 9 is a circuit diagram showing one power supply unit of a power system according to the second embodiment of the present invention.

Referring to FIG. 9. FIG. 9 is a circuit diagram showing one power supply unit 510 of a power system 500 according to the second embodiment of the present invention. Power system 500 comprises a plurality of power supply units 510, a voltage sharing bus 520a, a current sharing bus 520b, and at least one loading 530. Each of the power supply units 510 comprises a power source 540, a power converter 550, a FFC circuit 560, and a FBC circuit 570. The FFC circuit 560 comprises a resistor 560a and a first comparator 560b, and the FBC circuit 570 comprises a second comparator 570a, a diode 570b, an adder 570c, a current detector 570d, and a third comparator 570e. In the power system 500, the current sharing bus 520b is connected in theDM method and the inner loop regulation (ILR) is employed in the power system 500.

In the FFC circuit 560, the resistor 560a is connected to the input terminal P, of the power converter 550 thus that the input voltage of the power converter 550 is inputted into the voltage sharing bus 520a via the resistor 560a. One end of the voltage sharing bus 520a is electrically connected between the resistor 560a and the first comparator 560b. The first comparator 560b generates a first current reference value in accordance with the difference between the input voltage of the power converter 550 and a sharing voltage. The sharing voltage is the average of the input voltages inputted into the sharing bus 520a multiplied by weighted values.

In the FBC circuit 570, the second comparator 570a generates a second current reference value in accordance with the difference between a predetermined voltage Vref and the output voltage of the power converter 550, and forms a regulation loop RL. The positive terminal of the diode 570b is electrically connected to the second comparator 570a, and the negative terminal of that is electrically connected to the current sharing bus 520b, wherein the diode 570b is used for automatic master method (AM). In each of the power supply units 510, the second current reference value may be inputted into the current sharing bus 520b via the diode 570b so that the current sharing bus 520b can transmitted a third current reference value automatically selected from all the second current reference value. The adder 570c is used to add the first current reference value and the third current reference value together to generate a total current reference value, and the current detector 570d is electrically connected to the output terminal Po of the power converter 550 to detect the output current value of the power converter 550. The third comparator 570e is used to generate a current compensation value in accordance with the difference between the output current value of the power converter 550 and the total current reference value, wherein the third comparator 570e and the current detector 570d form a current sharing loop CSL. Then the power converter 550 adjusts the output current thereof in accordance with the current compensation value. The current sharing loop CSL is formed prior to the regulation loop RL, thereby forming the inner loop regulation (ILR). In addition, in the power system 500, the first comparator 560b, thesecondcomparator 570a, and the third comparator 570e are more prefer op amplifiers.

In view of the above description, the output current of the converter 550 can follow the voltage provide by the current sharing bus 520b and the difference between the voltage provided by the power source 540 and the sharing voltage transmitted by the voltage sharing bus 520a.

Figure 10:
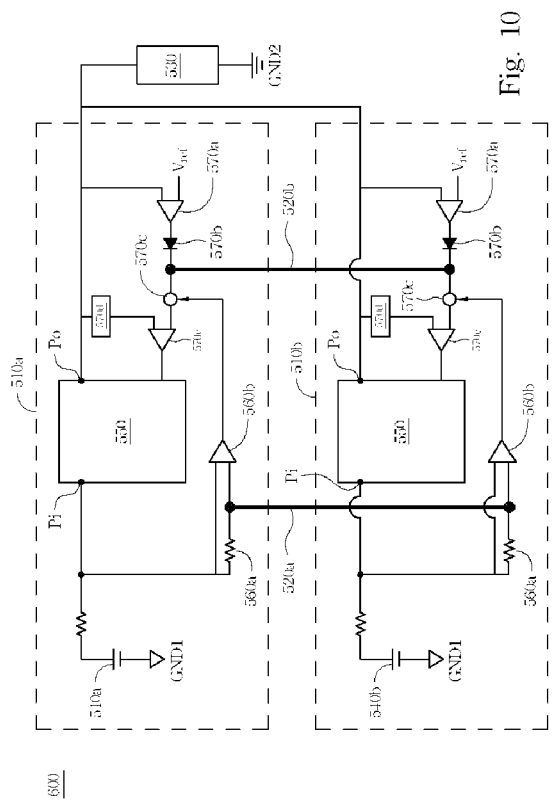
FIG. 10 is a circuit diagram showing a power system according to the second embodiment of the present invention.

Referring to FIG. 10. FIG. 10 is a circuit diagram showing a power system 600according to the second embodiment of the present invention. The power system 600 is a specific example of the power system 500. The power system 600 comprises a power supply unit 510a, a power supply unit 510b, a voltage sharing bus 520a, a current sharing bus 520b, and a loading 530, wherein the power supply unit 510a and the power supply unit 510b are similar to the power supply unit 510. One end of the voltage sharing bus 520a is electrically connected between the resistor 560a and the first comparator 560b of the power supply unit 510a, and another end of the voltage sharing bus 520a is electrically connected between the resistor 560a and the first comparator 560b of the power supply unit 510b.One end of the current sharing bus 520b is electrically connected between the diode 570b and the adder 570c of the power supply unit 510a, and another end of the current sharing bus 520b is electrically connected between the diode 570b and the adder 570c of the power supply unit 510b. In the power system 600, the power source 540a is used to provide a first voltage and the power source 540b is used to provide a second voltage, and the first voltage is higher than the second voltage. For example, when the first voltage (such as 48V) provided is higher than the second voltage (such as 38V), the FFC circuit 560 of the power supply unit 510a and that of the power supply unit 510b enable the output current value of the power supply unit 510a to be always higher than that of the power supply unit 510b, and keep the output current of the power supply unit 510b lower than the limitation thereof, thus that the power supply unit 510b is protected, and a output current difference between the power supply unit 510a and the power supply unit 510b in the power system 600 is smaller than that between the power supply unit 110a and the power supply unit 110b in the power system 200.

Figure 11:
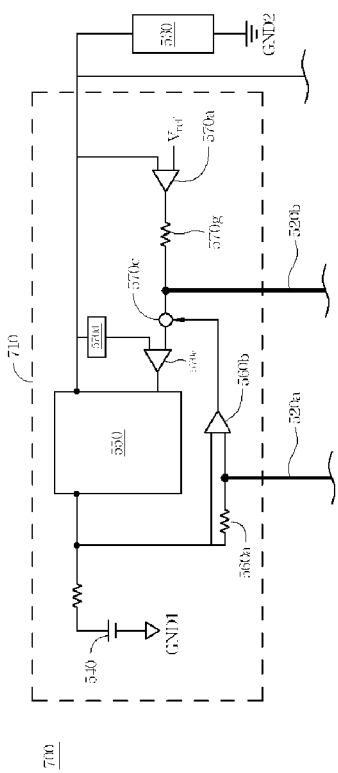
FIG. 11 is a circuit diagram showing the power system according to the second embodiment of the present invention.

Referring to FIG. 11. FIG. 11 is a circuit diagram showing a power system 700 according to the second embodiment of the present invention. The power system 700 is similar to the power system 500, but the difference is in that each of the power supply units 710 of the power system 700 comprises a resistor 570g instead of the diode 570b.In the power system 700, the average current (AC) method and the inner loop regulation (ILR) are employed, thus that the third current reference value is the average of the second current reference values inputted into the current sharing bus 520b multiplied by weighted values.

Figure 12:
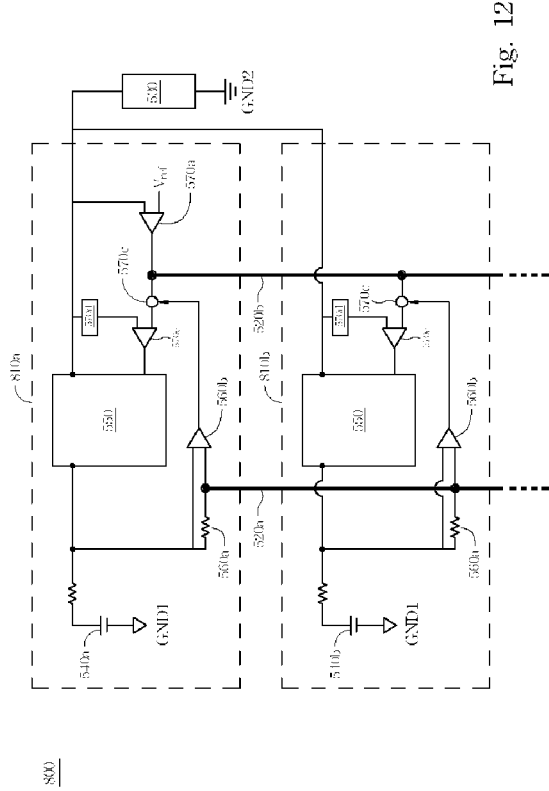
FIG. 12 is a circuit diagram showing a power system according to the second embodiment of the present invention.

Referring to FIG. 12. FIG. 12 is a circuit diagram showing a power system 800 according to the second embodiment of the present invention. The power system 800 comprises a master power supply unit 810a, at least one slave power supply unit 810b, the voltage sharing bus 520a, the current sharing bus 520b, and the loading 530. The master power supply unit 810a is similar to the power supply unit 510, but the difference is in that the master power supply unit 810a do not have the diode 570b, and one end of the current sharing bus 520b is connected between the first comparator 570a and the adder 570c of the master power supply unit 810a. In addition, the slave power supply unit 810b is similar to the master power supply unit 810a, but the difference is in that the slave power supply unit 810b do not have the first comparator 570a, and one end of the current sharing bus 520b is connected to the adder 570c of the slave power supply unit 810b.In the power system 800, the dedicated master (DM) method and the inner loop regulation (ILR) is employed, thus that the third current reference value is the second current reference value provided by the first comparator 570a of the master power supply unit 810a.

Figure 13:
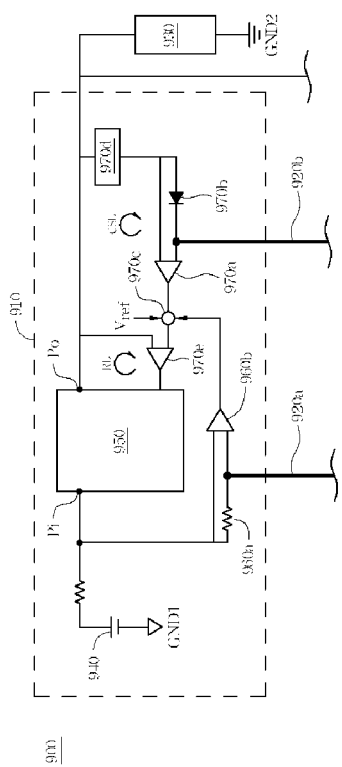
FIG. 13 is a circuit diagram showing one power supply unit of a power system according to a third embodiment of the present invention.

Referring to FIG. 13. FIG. 13 is a circuit diagram showing one power supply unit 910 of a power system 900 according to a third embodiment of the present invention. Power system 900 comprises a plurality of power supply units 910, a voltage sharing bus 920a, a current sharing bus 920b, and at least one loading 930. Each of the power supply units 910 comprises a power source 940, a converter 950, a FFC circuit 960, and a FBC circuit 970. The FFC circuit 960 comprises a resistor 960a and a first comparator 960b, and the FBC circuit 970 comprises a second comparator 970a, a diode 970b, an adder 970c, a current detector 970d, and a third comparator 970e. In the power system 900, the current sharing bus 920b is connected in the AM method and the outer loop regulation (OLR) is employed.

In the FFC circuit 960, the resistor 960a is connected to the input terminal P, of the power converter 950 thus that an input voltage of the power converter 950 is inputted into the voltage sharing bus 920a via the resistor 960a. One end of the voltage sharing bus 920a is electrically connected between the resistor 960a and the first comparator 960b. The first comparator 960b generates a first current reference value in accordance with the difference between the input voltage of the power converter 950 and a sharing voltage. The sharing voltage is the average of the input voltages inputted into the sharing bus 920a multiplied by weighted values.

In the FBC circuit 970, the current detector 970d is electrically connected to the output terminal Po of the power converter 950 to detect the output current value of the power converter 950. The positive terminal of the diode 970b is electrically connected to the current detector 970d, and the negative terminal of that is electrically connected to the current sharing bus 920b, wherein the diode 970b is used for automatic master method. In each of the power supply units 910, the output current value of the power converter 950 may be inputted into the current sharing bus 920b via the diode 970b so that the current sharing bus 920b can transmit a second current reference value automatically selected from all the output current values inputted into the current sharing bus 920b. The second comparator 970a generates a third current reference value in accordance with the difference between the second current reference value and the output current of the power converter 950, and forms a current sharing loop CSL. The adder 970c is used to add the first current reference value, the third current reference value, and a predetermined voltage Vref to generate a total current reference value. The third comparator 970e is used to generate a current compensation value in accordance with the difference between the output voltage value of the power converter 950 and the total current reference value, forms a regulation loop RL. Then the power converter 950 adjusts the output current thereof in accordance with the current compensation value. The regulation loop RL is formed prior to the current sharing loop CSL, thereby forming the outer loop regulation (OLR). In addition, in the power system 900, the first comparator 960b, the second comparator 970a, and the third comparator 970e are more prefer op amplifiers.

In view of the above description, the output current of the converter 950 can follow the voltage transmitted by the current sharing bus 920b and the difference between the voltage provided by the power source 940 and the sharing voltage transmitted by the voltage sharing bus 920a. It is noted that the predetermined voltage is not necessary in the third embodiment.

Figure 14:
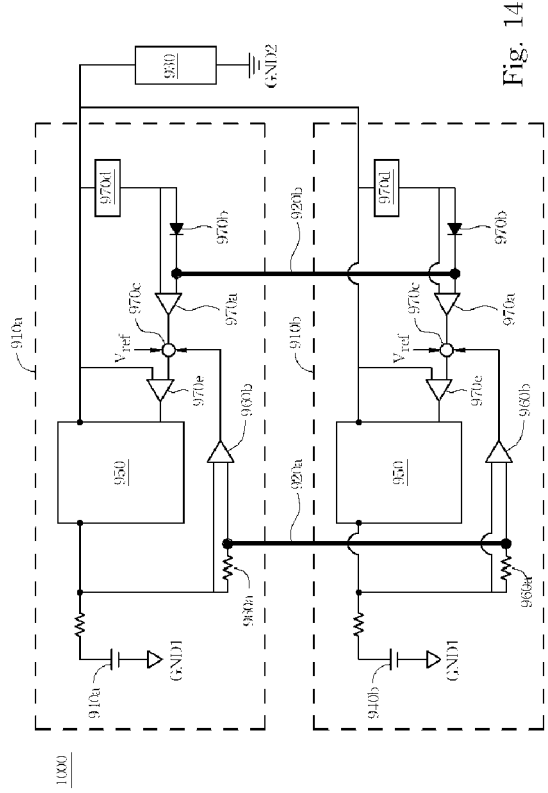
FIG. 14 is a circuit diagram showing a power system according to a third embodiment of the present invention.

Referring to FIG. 14. FIG. 14 is a circuit diagram showing a power system 1000 according to the third embodiment of the present invention. The power system 1000 is a specific example of the power system 900. The power system 1000 comprises a power supply unit 910a, a power supply unit 910b, a voltage sharing bus 920a, a current sharing bus 920b, and a loading 930, wherein the power supply unit 910a and the power supply unit 910b is similar to the power supply unit 910. One end of the voltage sharing bus 920a is electrically connected between the resistor 960a and the first comparator 960b of the power supply unit 910a, and another end of the voltage sharing bus 920a is electrically connected between the resistor 960a and the first comparator 960b of the power supply unit 910b. One end of the current sharing bus 920b is electrically connected between the diode 970b and the comparator 970a of the power supply unit 910a, and another end of the current sharing bus 920b is electrically connected between the diode 970b and the comparator 970a of the power supply unit 910b. The function of the power system 1000 is similar to that of the power system 600. For example, when a first voltage (such as 48V) provided by a power source 940a is higher than a second voltage (such as 38V) provided by a power source 940b, the FFC circuit 960 of the power supply unit 910a and that of the power supply unit 910b enable the output current value of the power supply unit 910a to be always higher than that of the power supply unit 910b and keep the output current of the power supply unit 910b lower than the limitation thereof, thus that the power supply unit 910b is protected, and a output current difference between the power supply unit 910a and the power supply unit 910b in the power system 900 is smaller than that between the power supply unit 910a and the power supply unit 910b in the power system 200.

Figure 15:
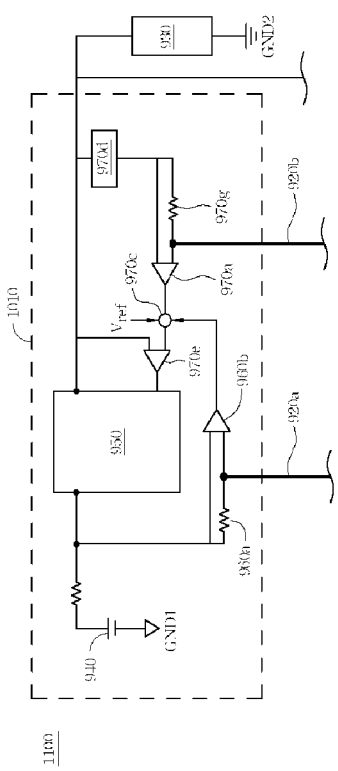
FIG. 15 is a circuit diagram showing the power system according to the third embodiment of the present invention.

Referring to FIG. 15. FIG. 15 is a circuit diagram showing a power system 1100 according to the third embodiment of the present invention. The power system 1100 is similar to the power system 900, but the difference is in that each of the power supply units 1010 of the power system 1000 comprises a resistor 970g instead of the diode 970b. In the power system 1100, the average current method and the outer loop regulation are employed, thus that the second current reference value is the average of the second current reference values inputted into the current sharing bus 920b multiplied by weighted values.

Figure 16:
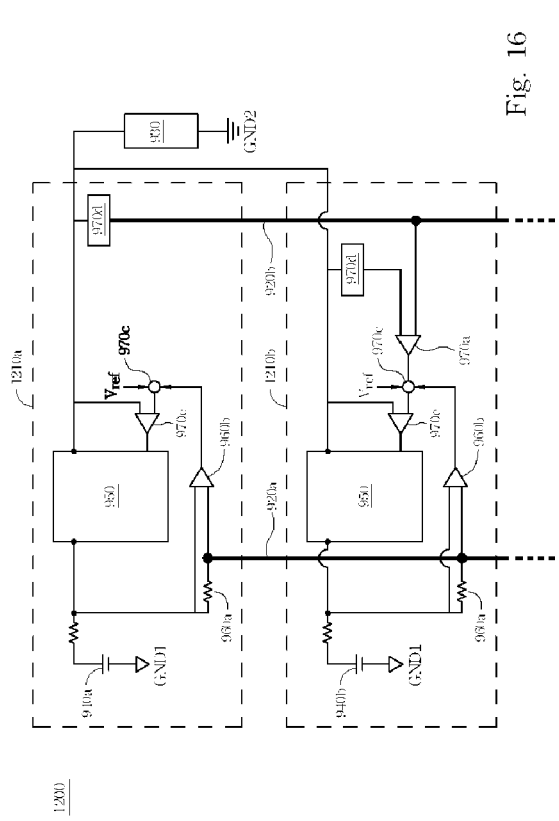
FIG. 16 is a circuit diagram showing a power system according to the third embodiment of the present invention.

Referring to FIG. 16. FIG. 16 is a circuit diagram showing a power system 1200 according to the third embodiment of the present invention. The power system 1200 comprises a master power supply unit 1210a, at least one slave power supply unit 1210b, the voltage sharing bus 920a, the current sharing bus 920b, and the loading 930. The master power supply unit 1210a is similar to the power supply unit 910, but the difference is in that the master power supply unit 1210a do not have the first comparator 970a and the diode 970b, and one end of the current sharing bus 920b is connected to the current detector 970d of the master power supply unit 1210a. In addition, the slave power supply unit 1210b is similar to the power supply unit 910, but the difference is in that the slave power supply unit 1210b do not have the diode 970b, and one end of the current sharing bus 920b is connected to the first comparator 970a. In the power system 1200, the dedicated master (DM) method and the outer loop regulation (OLR) is employed, thus that the second current reference value is the output current value detected by the current detector 970d of the master power supply unit 1210a.

Figure 17:
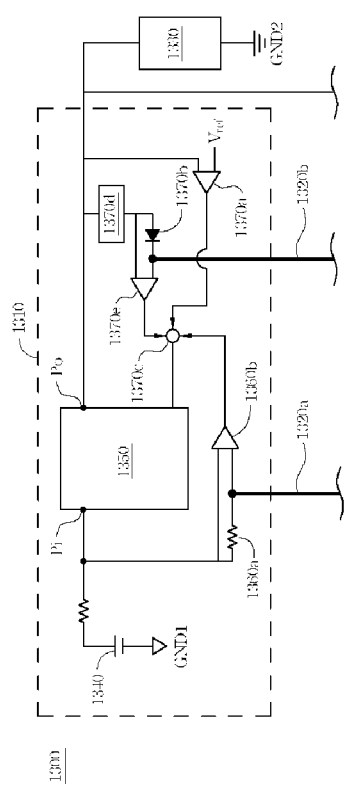
FIG. 17 is a circuit diagram showing one power supply unit of a power system 1300 according to a fourth embodiment of the present invention.

Referring to FIG. 17. FIG. 17 is a circuit diagram showing one power supply unit 1310 of a power system 1300 according to a fourth embodiment of the present invention. Power system 1300 comprises a plurality of power supply units 1310, a voltage sharing bus 1320a, a current sharing bus 1320b, and at least one loading 1330. Each of the power supply units 1310 comprises a power source 1340, a converter 1350, a FFC circuit 1360, and a FBC circuit 1370. The FFC circuit 1360 comprises a resistor 1360a and a first comparator 1360b, and the FBC circuit 1370 comprises a second comparator 1370a, a diode 1370b, an adder 1370c, a current detector 1370d, and a third comparator 1370e. In the power system 1300, the current sharing bus 1320b is connected in the AM method method and the dual loop regulation (DLR) is employed in the power system 1300.

In the FFC circuit 1360, the resistor 1360a is connected to the input terminal P, of the power converter 1350 thus that the input voltage of the power converter 1350 is inputted into the voltage sharing bus 1320a via the resistor 1360a. One end of the voltage sharing bus 1320a is electrically connected between the resistor 1360a and the first comparator 1360b. The first comparator 1360b generates a first current reference value in accordance with the difference between the input voltage of the power converter 1350 and a sharing voltage. The sharing voltage is the average of the input voltages inputted into the sharing bus 1320a multiplied by weighted values.

In the FBC circuit 1370, the second comparator 1370a generates a second current reference value in accordance with the difference between a predetermined voltage Vref and the output voltage of the power converter 1350, and forms a regulation loop RL. The current detector 1370d is electrically connected to the output terminal Po of the power converter 1350 to detect an output current value of the power converter 1350. The positive terminal of the diode 1370b is electrically connected to the current detector 1370d and the negative terminal of that is electrically connected to the current sharing bus 1320b, wherein the diode 1370b is used for automatic master method. In each of the power supply units 1310, a output current value of the converter 1350 may be inputted into the current sharing bus 1320b via the diode 1370b so that the current sharing bus 1320b can transmitted a third current reference value automatically selected from all the output current values of the power supply units 1310. The third comparator 1370e is used to generate a fourth current reference value in accordance with the difference between the third current reference value and the output current value of the power converter 1350. The adder 1370c is used to add the first current reference, the second current reference, and the fourth current reference value together to generate a current compensation reference value. Then the power converter 1350 adjusts the output current thereof in accordance with the current compensation value. The current sharing loop CSL and the regulation loop RL are connected in parallel, thereby forming the dual loop regulation (DLR). In addition, in the power system 1300, the first comparator 1360b, the second comparator1370a, and the third comparator 1370e are more prefer op amplifiers.

In view of the above description, the output current of the converter 1350 can follow the voltage transmitted by the current sharing bus 1320b, and the difference between the voltage provided by the power source 1340 and the sharing voltage transmitted by the voltage sharing bus 1320a.

Figure 18:
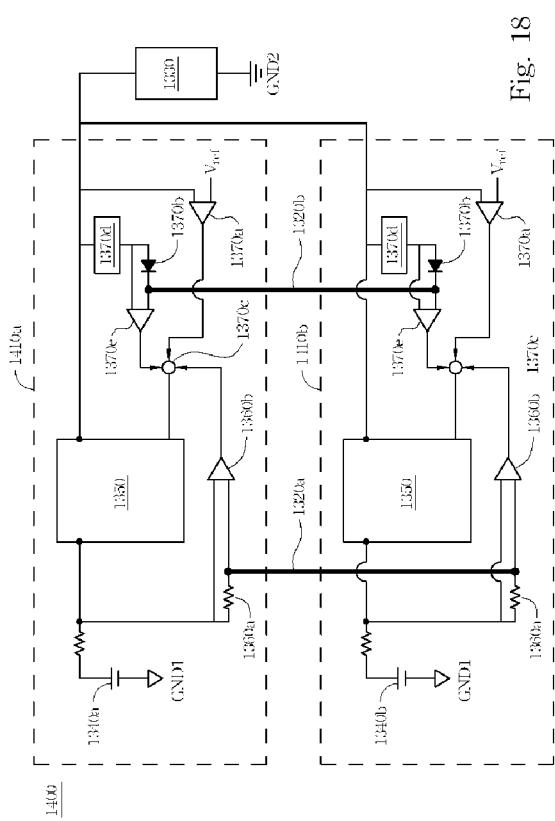
FIG. 18 is a circuit diagram showing a power system according to the fourth embodiment of the present invention.

Referring to FIG. 18. FIG. 18 is a circuit diagram showing a power system 1400 according to the fourth embodiment of the present invention. The power system 1400 is a specific example of the power system 1300. The power system 1400 comprises a power supply unit 1410a, a power supply unit 1410b, the voltage sharing bus 1320a, a current sharing bus 1320b, and the loading 1330, wherein the power supply unit 1410a and the power supply unit 1410b is similar to the power supply unit 1310. The power source 1340a is used to provide a first voltage, and the power source 1340b is used to provide a second voltage. One end of the voltage sharing bus 1320a is electrically connected between the resistor 1360a and the first comparator 1360b of the power supply unit 1410a, and another end of the voltage sharing bus 1320a is electrically connected between the resistor 1360a and the first comparator 1360b of the power supply unit 1410b. One end of the current sharing bus 1320b is electrically connected between the diode 1370b and and the third comparator 1370e of the power supply unit 1410a, and another end of the current sharing bus 1320b is electrically connected between the diode 1370b and the third comparator 1370e of the power supply unit 1410b. The function of the power system 1400 is similar to that of the power system 1000. For example, when a first voltage (such as 48V) provided by a power source 1340a is higher than a second voltage (such as 38V) provided by a power source 1340b, the FFC circuit 1360 of the power supply unit 1410a and that of the power supply unit 1410b enable the output current value of the power supply unit 1410a to be always higher than that of the power supply unit 1410b and keep the output current of the power supply unit 1410b lower than the limitation thereof, thus that the power supply unit 1410b is protected, and a output current difference between the power supply unit 1410a and the power supply unit 1410b in the power system 1400 is smaller than that between the power supply unit 1410a and the power supply unit 1410b in the power system 200.

Figure 19:
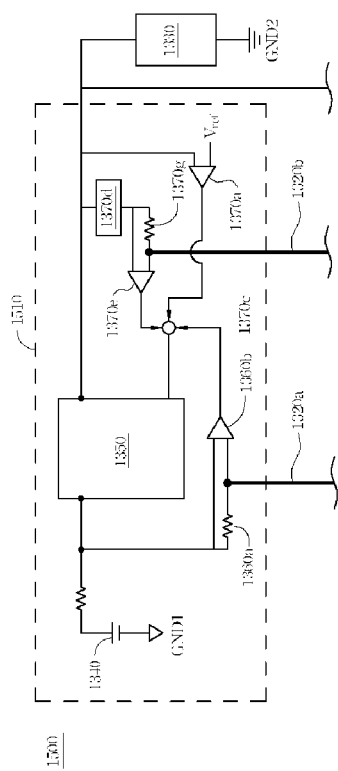
FIG. 19 is a circuit diagram showing the power system according to the fourth embodiment of the present invention.

Referring to FIG. 19. FIG. 19 is a circuit diagram showing a power system 1500 according to the fourth embodiment of the present invention. The power system 1500 is similar to the power system 1300, but the difference is in that each of the power supply units 1510 of the power system 1500 comprises a resistor 1370g instead of the diode 1370b. In the power system 1500, the average current (AC) method and the dual loop regulation (DLR) are employed, thus that the third current reference value is the average of all the output current values detected by the current detectors 1370d multiplied by weighted values.

Figure 20:
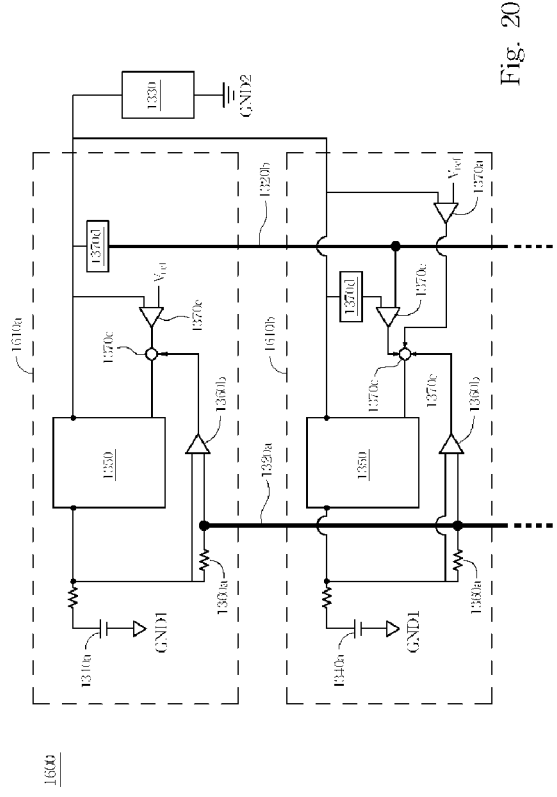
FIG. 20 is a circuit diagram showing a power system according to the fourth embodiment of the present invention.

Referring to FIG. 20. FIG. 20 is a circuit diagram showing a power system 1600 according to the fourth embodiment of the present invention. The power system 1600 comprises a master power supply unit 1610a, at least one slave power supply unit 1610b, the voltage sharing bus 1320a, the current sharing bus 1320b, and the loading 1330. The master power supply unit 1610a is similar to the power supply unit 1310, but the difference is in that the master power supply unit 1610a does not have the third comparator 1370e and the diode 1370b, and one end of the current sharing bus 1320b is connected to the current detector 1370d of the master power supply unit 1610a. In addition, the slave power supply unit 1610b is similar to the power supply unit 1310, but the difference is in that the slave power supply unit 1610b do not have the diode 1370b, and one end of the current sharing bus 1320b is connected to the third comparator 1370e of the slave power supply unit 1610b. In the power system 1600, the dedicated master (DM) method and the dual loop regulation (DLR) is employed, thus that the third current reference value is the output current value detected by the current detector 1370d of the master power supply unit 1610a.

Figure 21:
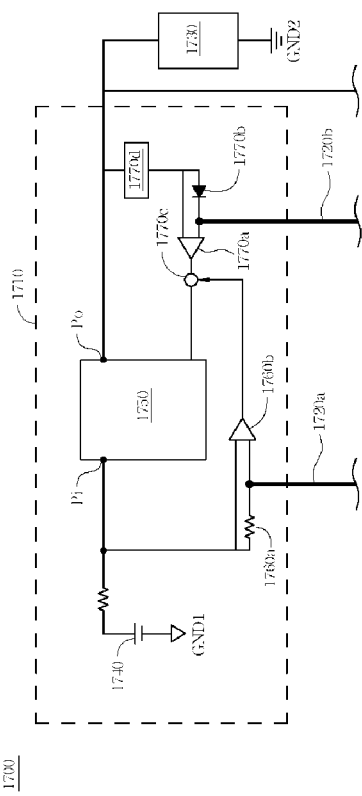
FIG. 21 is a circuit diagram showing one power supply unit of a power system according to a fifth embodiment of the present invention.

Referring to FIG. 21. FIG. 21 is a circuit diagram showing one power supply unit 1710 of the power system 1700 according to a fifth embodiment of the present invention. Power system 1700 comprises a plurality of power supply units 1710, a voltage sharing bus 1720a, a current sharing bus 1720b, and at least one loading 1730. Each of the power supply units 1710 comprises a power source 1740, a converter 1750, a FFC circuit 1760, and a FBC circuit 1770. The FFC circuit 1760 comprises a resistor 1760a and a first comparator 1760b, and the FBC circuit 1770 comprises a second comparator 1770a, a diode 1770b, an adder 1770c, and a current detector 1770d. In the power system 1700, the current sharing bus 1720b is connected in the AM method and the single loop regulation (SLR) is employed in the power system 1700.

In the FFC circuit 1760, the resistor 1760a is connected to the input terminal P, of the power converter 1750 thus that the input voltage of the power converter 1750 is inputted into the voltage sharing bus 1720a via the resistor 1760a. One end of the voltage sharing bus 1720a is electrically connected between the resistor 1760a and the first comparator 1760b. The first comparator 1760b generates a first current reference value in accordance with the difference between the input voltage of the power converter 1750 and a sharing voltage. The sharing voltage is the average of the input voltages inputted into the sharing bus 1720a or the average of the input voltages inputted into the sharing bus 1720a multiplied by weighted values.

In the FBC circuit 1770, the current detector 1770d is electrically connected to the output terminal Po of the power converter 1370 to detect the output current value of the power converter 1350. The positive terminal of the diode 1770b is electrically connected to the current detector 1770d and the negative terminal of that is electrically connected to the current sharing bus 1720b, wherein the diode 1770b is used for automatic master method. In each of the power supply units 1710, the output current value of the power converter 1750 may be inputted into the current sharing bus 1720b via the diode 1770b so that the current sharing bus 1720b can transmitted a second current reference value selected automatically from all the output current values inputted into the current sharing bus 1720b. The second comparator 1770a generates a third current reference value in accordance with the difference between the second current reference value and the output current value of the power converter 1750. The adder 1770c is used to add the first current reference and the third current reference value together to generate a current compensation value. Then the power converter 1750 adjusts the output current thereof in accordance with the current compensation value. Because the power system does not comprise regulation loop RL, the single loop regulation is formed. In addition, in the power system 1700, the first comparator 1760b, the second comparator 1770a, and the third comparator 1770e are more prefer op amplifiers.

In view of the above description, the output current of the converter 1750 can follow the voltage transmitted by the current sharing bus 1720b, and the difference between the voltage provided by the power source 1740 and the sharing voltage transmitted by the voltage sharing bus 1720a.

Figure 22:
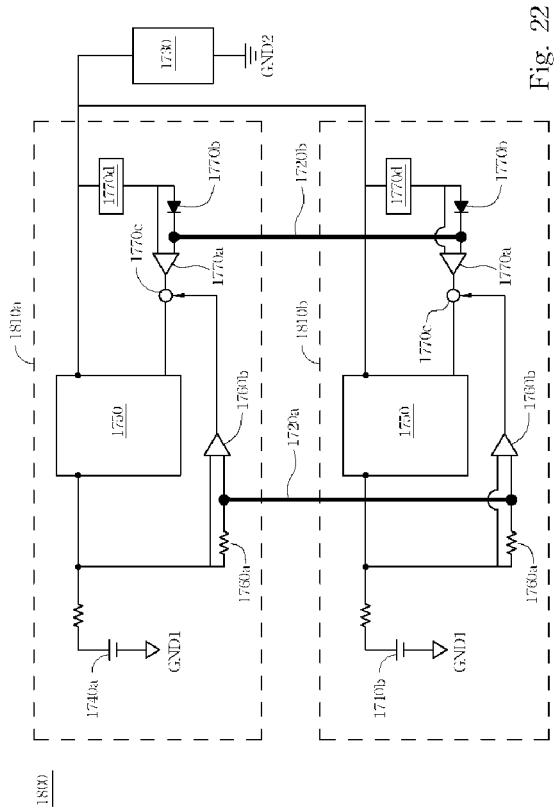
FIG. 22 is a circuit diagram showing a power system according to the fifth embodiment of the present invention.

Referring to FIG. 22. FIG. 22 is a circuit diagram showing a power system 1800 according to the fifth embodiment of the present invention. The power system 1800 is a specific example of the power system 1700. The power system 1800 comprises a power supply unit 1810a, a power supply unit 1810b, the voltage sharing bus 1720a, a current sharing bus 1720b, and the loading 1730, wherein the power supply unit 1810a and power supply unit 1810b are similar to the power supply unit 1710. The power source 1740a is used to provide a first voltage, and the power source 1740b is used to provide a second voltage. One end of the voltage sharing bus 1720a is electrically connected between the resistor 1760a and the first comparator 1760b of the power supply unit 1810a, and another end of the voltage sharing bus 1720a is electrically connected between the resistor 1760a and the first comparator 1760b of the power supply unit 1810b. One end of the current sharing bus 1720b is electrically connected between the diode 1770b and the second comparator 1770a of the power supply unit 1810a, and another end of the current sharing bus 1720b is electrically connected between the diode 1770b and the second comparator 1770a of the power supply unit 1810b. The function of the power system 1800 is similar to that of the power system 1000. For example, when a first voltage (such as 48V) provided by a power source 1740a is higher than a second voltage (such as 38V) provided by a power source 1370b, the FFC circuit 1760 of the power supply unit 1810a and that of the power supply unit 1810b enable the output current value of the power supply unit 1710a to be always higher than that of the power supply unit 1810b and keep the output current of the power supply unit1810b lower than the limitation thereof, thus that the power supply unit 1810b is protected, and a output current difference between the power supply unit 1810a and the power supply unit 1810b in the power system 1800 is smaller than that between the power supply unit 1810a and the power supply unit 1810b in the power system 200.

Figure 23:
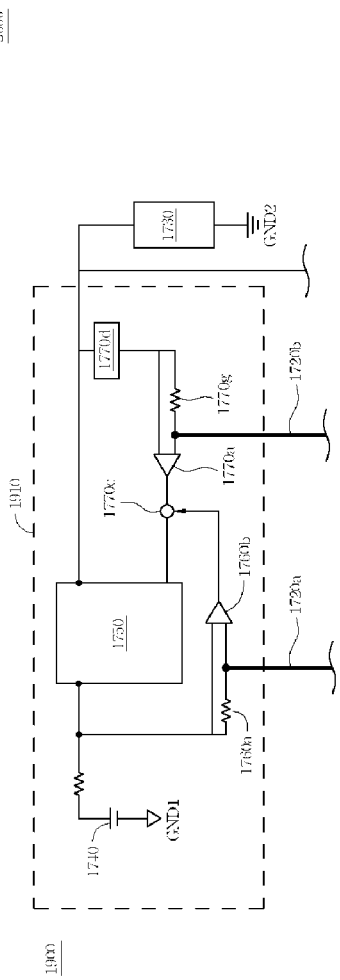
FIG. 23 is a circuit diagram showing a power system according to the fifth embodiment of the present invention.

Referring to FIG. 23. FIG. 23 is a circuit diagram showing a power system 1900 according to the fifth embodiment of the present invention. The power system 1900 is similar to the power system 1700, but the difference is in that each of the power supply units 1910 of the power system 1900 comprises a resistor 1770g instead of the diode 1770b. In the power system 1900, the average current method and the single loop regulation (SLR) are employed, thus that the second current reference value is the average of all the output current values detected by the current detectors 1770d.

Figure 24:
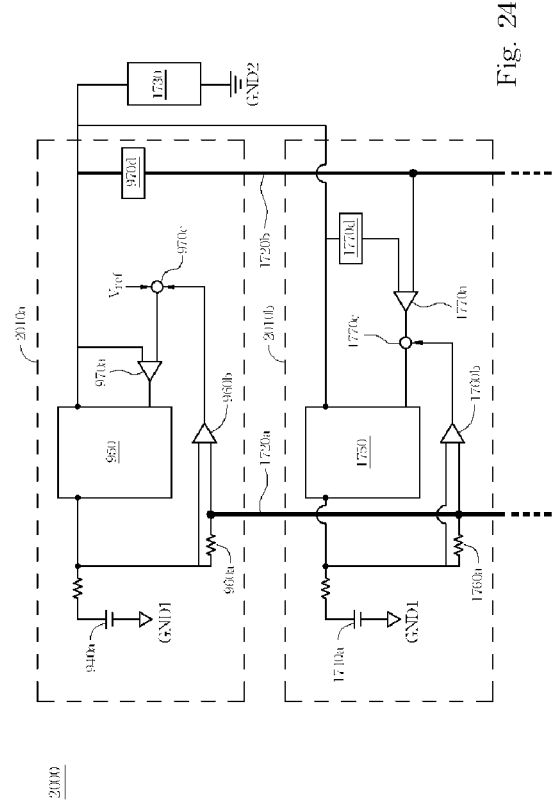
FIG. 24 is a circuit diagram showing the power system according to the fifth embodiment of the present invention.

Referring to FIG. 24. FIG. 24 is a circuit diagram showing a power system 2000 according to the fifth embodiment of the present invention. The power system 2000 comprises a master power supply unit 2010a, at least one slave power supply unit 2010b, the voltage sharing bus 1720a, the current sharing bus 1720b, and the loading 1730. The master power supply unit 2010a is similar to the power supply unit 910a, but the difference is in that the FBC circuit 970 of the master power supply unit 2010a does not comprises the second comparator 970a and the diode 970b, wherein the current detector is used to detect the output current of the power converter 950; the adder 970c is used to add the first current reference value and a predetermined voltage Vref together to generate a fifth current reference value; and third comparator 970e is used to generate a current compensation value in accordance with the difference between the fifth current reference value and the output voltage value of the power converter 950 of the master power supply unit 2010a. Then the power converter 950 of the master power supply unit 2010a adjusts the output current thereof in accordance with the current compensation value. In addition, one end of the current sharing bus 1720b is electrically connected to the current detector 970d to transmit the output current value of the power converter 950 of the master power supply unit 2010a. The slave power supply unit 2010b is similar to the power supply unit 1710, but the difference is in that the slave power supply unit 2010b do not have the diode 1770b, and one end of the current sharing bus 1720b is connected to the second comparator 1770a. In the power system 2000, the dedicated master method and single loop regulation is employed, thus that the second current reference value is the output current value detected by the current detector 970d of the master power supply unit 2010a.

Figure 25:
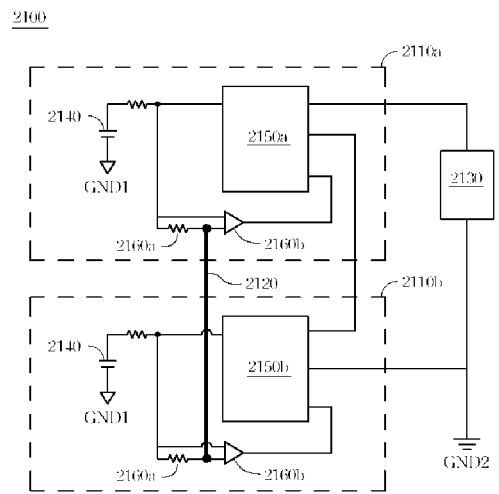
FIG. 25 is a circuit diagram showing a power system according to a sixth embodiment of the present invention.

Referring to FIG. 25. FIG. 25 is a circuit diagram showing a power system 2100 according to a sixth embodiment of the present invention. The power system 2100 comprises a power supply unit 2110a, a power supply unit 2110b, a voltage sharing bus 2120, and at least a loading 2130. The power supply unit 2110a comprises a power source 2140, a power converter 2150a, and a FFC circuit 2160, wherein the power converter 2150a comprises a current output terminal and a voltage reference terminal, and the current output terminal is connected to the loading 2130 to provide power. The power supply unit 2110b comprises the power source 2140, a power converter 2150b, and the FFC circuit 2160, wherein the power converter 2150b comprises a current output terminal and a voltage reference terminal. The current output terminal of the converter 2150b is electrically connected to the voltage reference terminal of the converter 2150a, and the voltage reference terminal of the converter 2150b is electrically connected to ground voltage.

The FFC circuit 2160 comprises a resistor 2160a, and a first comparator 2160b. Because the function of the FFC circuit 2160 of the power supply unit 2110a and that of the power supply unit 2110b are the same, the following description takes the FFC circuit 2160 of the power supply unit 2110a as an example for explanation. In the FFC circuit 2160 of the power supply unit 2110a, the resistor 2160a is connected to the input terminal P, of the power converter 2150a thus that the input voltage of the power converter 2150a is inputted into the voltage sharing bus 2120 via the resistor 2160a. One end of the voltage sharing bus 2120 is electrically connected between the resistor 2160a and the first comparator 2160b. The first comparator 2160b generates a voltage compensation value in accordance with the difference between the input voltage of the power converter 2150a and a sharing voltage. The sharing voltage is the average of the input voltages inputted into the sharing bus 2120 multiplied by weighted values. Then the power converter 2150a adjusts the output voltage Vo thereof in accordance with the voltage compensation value.

In the power system 2100, the power source 2140 of the power supply unit 2110a provides a first voltage, and the power source 2140 of the power supply unit 2110b provides a second voltage, wherein the first voltage is higher than the second voltage. The function of the power system 2100 is described in the followings. For example, when the first voltage (such as 48V) is higher than the second voltage (such as 38V), the FFC circuit 2160 of the power supply unit 2110a and that of the power supply unit 2110b enable the output voltage value of the power supply unit 2110a to be always higher than that of the power supply unit 2110b so that the power supply unit 2110b do not output the voltage exceeding the limitation thereof.

Figure 26:
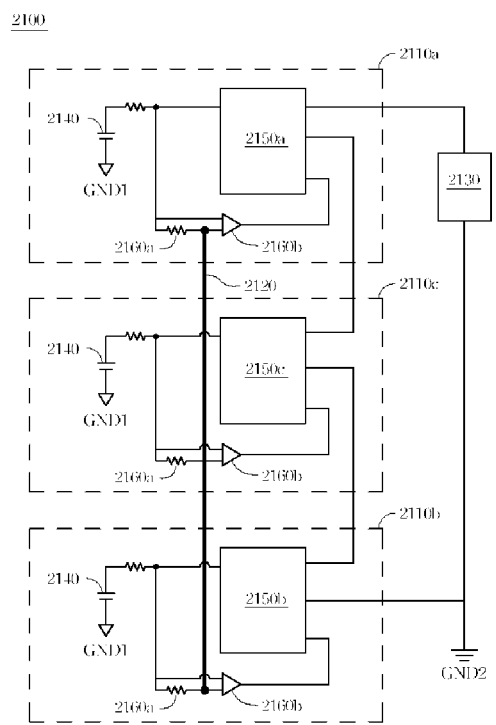
FIG. 26 is a circuit diagram showing a power system according to the sixth embodiment of the present invention.

Referring to FIG. 26. FIG. 26 is a circuit diagram showing a power system 2200 according to the third embodiment of the present invention. The power system 2200 is similar to the power system 2100, but the difference is in that the power system 2200 further comprise a third power supply unit 2110. The third power supply unit 2110c is similar to the first power supply unit 2110a, but the difference is in that the current output terminal of the power converter 2150c is electrically connected to the voltage reference terminal of the power converter 2150a, and the voltage reference terminal of the power converter 2150c is electrically connected to the current output terminal of the power converter 2150b. Because the advantages of the power system 2200 are similar to the power system 2100, the advantages of the power system 2200 are not described here. In addition, the amount of the third power supply unit is not limited here, connecting every two adjacent ones of the third power supply units can achieve the same advantages with that of the power system 2200.

In view of the above description, the output current of the converter 2150 can follow the difference between the voltage provided by the power source 2140 and the sharing voltage transmitted by the voltage sharing bus 2120.

Therefore, the power system shown in the respective embodiments of the present invention provide a plurality of power sources connected in parallel or serial, so as to prevent the whole power system from not working when a single power source is poor or fails. Further, the converters are adapted to self-regulate the output current (or output voltage) supplied to the loading respectively according to the input status of each the power sources, i.e. the power source with higher input status can supply more power to the loading, and the power source with lower input status can avoid supplying too much power, thereby enhancing the power efficiency and life time of the power system.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structure.

The invention claimed is:

1. A power system, comprising:
   a voltage sharing bus used to transmit a sharing voltage; and
   a plurality of power supply units electrically connected in parallel and used to provide power to a loading, wherein each of the power supply units is electrically connected to the voltage sharing bus to receive the sharing voltage, and comprises:
   a power converter electrically connected to a power source and the loading;
   a resistor electrically connected to a input terminal of the power converter;
   a first comparator used to generate a current reference value in accordance with the difference between the sharing voltage and an input voltage of the power converter, wherein the first comparator is electrically connected to the resistor and the input terminal, and one end of the voltage sharing bus is electrically connected between the resistor and the first comparator;
   a current detector used to detect an output current value of the power converter; and
   a second comparator used to generate the current compensation value in accordance with the difference between the output current value and the current reference value thus that the power converter adjusts the output current value thereof in accordance with the current compensation value.

2. The power system as claimed in claim 1, wherein each of the power supply units further comprises an adder electrically connected between the power converter and the second comparator, wherein the adder is used to add the current reference value and a predetermined voltage value together.

3. The power system as claimed in claim 1, wherein the sharing voltage is the average of the input voltages of the power converters multiplied by a plurality of weighted values.

4. The power system as claimed in claim 1, wherein the power source is a manpower generator, a solar cell, a fuel cells, a wind-power generator, a thermal-power generator, a water-power generator, a electric power generator and a electric cell.

5. A power system, comprising:
   a voltage sharing bus used to transmit a sharing voltage;
   a current sharing bus used to transmit a first current reference; and
   a plurality of power supply units electrically connected in parallel and used to provide power to a loading, wherein the power supply units are electrically connected to the voltage sharing bus to receive the sharing voltage and electrically connected to the current sharing bus to receive the first current reference value, and each of the power supply units comprises:

a power converter electrically connected to a power source and the loading;

a feed-forward control (FFC) circuit used to generate a second current reference value in accordance with the difference between the sharing voltage and an input voltage of the power converter, wherein one end of the voltage sharing bus is electrically connected to the feed-forward control circuit; and a feedback control (FBC) circuit used to generate a current compensation value in accordance with the first current reference value and the second current reference value, wherein one end of the current sharing bus is electrically connected to the feedback control circuit;

wherein the power converter adjusts an output current value thereof in accordance with the current compensation value.

6. The power system as claimed in claim 5, wherein the feed-forward control circuit comprises:

a resistor electrically connected to a input terminal of the power converter; and a first comparator used to generate the second current reference value in accordance with the difference between the sharing voltage and an input voltage of the power converter, wherein the first comparator is electrically connected to the resistor and the input terminal, and one end of the voltage sharing bus is electrically connected between the resistor and the first comparator.

7. The power system as claimed in claim 5, wherein the feedback control circuit comprises:

a first comparator used to generate a third current reference value in accordance with the difference between a output voltage of the converter and a predetermined voltage;

a diode, wherein a positive terminal of the diode is electrically connected to the first comparator and a negative terminal of the diode is electrically connected to the end of the current sharing bus;

an adder used to add the first current reference value and the second current reference value together to generate a total current reference value; and a current detector used to detect the output current value of the power converter;

a second comparator used to generate the current compensation value in accordance with the difference between the total current reference value and the output current value of the power converter.

8. The power system as claimed in claim 5, wherein the feedback control circuit comprises:

a first comparator used to generate a third current reference value in accordance with the difference between a output voltage of the converter and a predetermined voltage;

a resistor electrically connected between the first comparator and the end of the current sharing bus;

an adder used to add the first current reference value and the second current reference value together to generate a total current reference value;

a current detector used to detect the output current value of the power converter;

a second comparator used to generate the current compensation value in accordance with the difference between the total current reference value and the output current value of the power converter.

9. The power system as claimed in claim 5, wherein the feedback control circuit comprises:

a current detector used to detect the output current value of the power converter;

a diode, wherein a positive terminal of the diode is electrically connected to the current detector and a negative terminal of the diode is electrically connected to the end of the current sharing bus;

a first comparator electrically connected to the current detector and the end of the current sharing bus, wherein the first comparator is used to generate a third current reference value in accordance with the difference between output current value and the second current reference value;

an adder used to add the third current reference value and the second current reference value together to generate a total current reference value; and a second comparator used to generates the current compensation value in accordance with the total current reference value and the output current value of the power converter.

10. The power system as claimed in claim 9, wherein the adder further adds a predetermined voltage to the sum of the third current reference value and the second current reference value together.

11. The power system as claimed in claim 5, wherein the feedback control circuit comprises:

a current detector used to detect the output current value of the power converter;

a resistor, electrically connected between the current detector and the end of the current sharing bus;

a first comparator connected to the current detector and the end of the current sharing bus, wherein the first comparator is used to generate a third current reference value in accordance with the difference between output current value and the second current reference value;

an adder used to add the third current reference value and the second current reference value together to generate a total current reference value; and a second comparator used to generates the current compensation value in accordance with the total current reference value and the output current value of the power converter.

12. The power system as claimed in claim 11, wherein the adder further adds a predetermined voltage on the sum of the third current reference value and the second current reference value together.

13. The power system as claimed in claim 5, wherein the feedback control circuit comprises:

a current detector used to detect the output current value of the power converter;

a diode, wherein a positive terminal of the diode is electrically connected to the current detector and a negative terminal of the diode is electrically connected to the end of the current sharing bus;

a first comparator electrically connected to the current detector and the end of the current sharing bus, wherein the first comparator is used to generate a third current reference value in accordance with the difference between the output current value of the converter and the first current reference value;

a second comparator used to generates a fourth current reference value in accordance with the difference between the a output voltage value of the converter and a predetermined voltage; and an adder used to add the second current reference value, the third current reference value, and the fourth current reference value together to generate the current compensation value.

14. The power system as claimed in claim 5, wherein the feedback control circuit comprises:

a current detector used to detect the output current value of the power converter;

a diode, wherein a positive terminal of the diode is electrically connected to the current detector and a negative terminal of the diode is electrically connected to the end of the current sharing bus;

a first comparator electrically connected to the current detector and the end of the current sharing bus, wherein the first comparator is used to generate a third current reference value in accordance with the difference between the output current value of the converter and the first current reference value; and an adder used to add the second current reference value, and the third current reference value together to generate the current compensation value.

15. The power system as claimed in claim 5, wherein the feedback control circuit comprises:

a current detector used to detect the output current value of the power converter;

a resistor electrically connected between the current detector and the end of the current sharing bus;

a first comparator electrically connected to the current detector and the end of the current sharing bus, wherein the first comparator is used to generate a third current reference value in accordance with the difference between the output current value of the converter and the first current reference value; and an adder used to add the second current reference value, and the third current reference value together to generate the current compensation value.

16. The power system as claimed in claim 5, wherein the sharing voltage is the average of the input voltages of the power converters multiplied by a plurality of weighted values.

17. The power system as claimed in claim 5, wherein the power source is a manpower generator, a solar cell, a fuel cells, a wind-power generator, a thermal-power generator, a water-power generator, a electric power generator and a electric cell.

18. A power system, comprising:

a voltage sharing bus used to transmit a sharing voltage;

a current sharing bus used to transmit a first current reference value;

a master power supply unit used to provide power to at least one loading and provide the first current reference value, wherein the master power supply unit comprises:

a first power converter electrically connected to a first power source and the at least one loading;

a first feed-forward control (FFC) circuit used to generate a second current reference value in accordance with the difference between the sharing voltage and a first input voltage of the power converter; and a first feedback control (FBC) circuit used to generate the first current reference value, and generate a first current compensation value in accordance with a first output voltage of the first converter and the second current reference value;

wherein the first power converter adjusts a first output current value thereof in accordance with the first current compensation value; and at least one slave power supply unit electrically connected in parallel with the and used to provide power to the at least one loading, wherein the slave power supply units are electrically connected to the voltage sharing bus to receive the sharing voltage and electrically connected to the current sharing bus to receive the first current reference value, and each of the power supply units comprises:

a second power converter electrically connected to a second power source and the at least one loading;

a second feed-forward control (FFC) circuit used to generate a third current reference value in accordance with the difference between the sharing voltage and a second input voltage of the second power converter; and a second feedback control (FBC) circuit used to generate a second current compensation value in accordance with the first current reference value and the third current reference value;

wherein the second power converter adjusts a second output current value thereof in accordance with the second current compensation value.

19. The power system as claimed in claim 18, wherein the first feed-forward control circuit comprises:

a resistor electrically connected to a input terminal of the first power converter; and a first comparator used to generate the second current reference value in accordance with the difference between the sharing voltage and a first input voltage of the first power converter, wherein the first comparator is electrically connected to the resistor and the input terminal, and one end of the voltage sharing bus is electrically connected between the resistor and the first comparator.

20. The power system as claimed in claim 18, wherein the second feed-forward control circuit comprises:

a resistor electrically connected to a input terminal of the second power converter; and a first comparator used to generate the third current reference value in accordance with the difference between the sharing voltage and a second input voltage of the second power converter, wherein the first comparator is electrically connected to the resistor and the input terminal, and one end of the voltage sharing bus is electrically connected between the resistor and the first comparator.

21. The power system as claimed in claim 18, wherein the first feedback control circuit comprises:

a first comparator used to generate the first current reference value in accordance with the difference between the output voltage of the first converter and a predetermined voltage;

an adder used to add the first current reference value and the second current reference value together to generate a total current reference value; and a current detector used to detect the output current value of the first power converter;

a second comparator used to generate the first current compensation value in accordance with the difference between the total current reference value and the output current value of the power converter.

22. The power system as claimed in claim 18, wherein the second feedback control circuit comprises:

an adder used to add the first current reference value and the second current reference value together to generate a total current reference value; and a current detector used to detect the output current value of the second power converter;

a first comparator used to generate the second current compensation value in accordance with the difference between the total current reference value and the output current value of the power converter.

23. The power system as claimed in claim 18, wherein the first feedback control circuit comprises:
- a current detector used to detect a output current value of the first power converter to generate the first current reference value;
- a first comparator used to generate the first current compensation value in accordance with the difference between the output voltage of the first converter and the second current reference value.

24. The power system as claimed in claim 18, wherein the first feedback control circuit comprises:
- a current detector used to detect a output current value of the first power converter to generate the first current reference value;
- an adder used to add the first current reference value and the second current reference value together to generate a total current reference value; and
- a first comparator used to generate the first current compensation value in accordance with the difference between the output voltage of the first converter and the second current reference value.

25. The power system as claimed in claim 18, wherein the second feedback control circuit comprises:
- a first current detector used to detect the second output current value of the second converter;
- a first comparator used to generate a fourth current reference value in accordance with the difference between the first current reference value and the second output current value of the second power converter;
- an adder used to add the fourth current reference value and the third current reference value together to generate a total current reference value; and
- a second comparator used to generate the second current compensation value in accordance with the difference between the total current reference value and a second output voltage of the second power converter.

26. The power system as claimed in claim 18, wherein the first feedback control circuit comprises:
- a current detector used to detect a output current value of the first power converter to generate the first current reference value;
- a first comparator used to generate a fourth current reference value in accordance with the difference between the output voltage value of the first converter and a predetermined voltage value; and
- an adder used to add the fourth current reference value and the second current reference value together to generate the first current compensation value.

27. The power system as claimed in claim 18, wherein the second feedback control circuit comprises:
- a first current detector used to detect the second output current value of the second converter;
- a first comparator used to generate a fourth current reference value in accordance with the difference between the first current reference value and the second output current value of the second power converter;
- a second comparator used to generate a fifth current reference value in accordance with a second output voltage value of the second converter and a predetermined voltage value; and
- an adder used to add the fourth current reference value, fifth current reference value, and the third current reference value together to generate the second current compensation value.

28. The power system as claimed in claim 18, wherein the first feedback control circuit comprises:
- a current detector used to detect a output current value of the first power converter to generate the first current reference value;
- a first comparator used to generate the first current compensation value in accordance with the difference between the first output voltage of the first converter and the second current reference value.

29. The power system as claimed in claim 18, wherein the first feedback control circuit comprises:
- a current detector used to detect a output current value of the first power converter to generate the first current reference value;
- an adder used to add the second current reference value and a predetermined voltage together to generate a total current reference value; and
- a first comparator used to generate the first current compensation value in accordance with the difference between the output voltage of the first converter and the total current reference value.

30. The power system as claimed in claim 18, wherein the second feedback control circuit comprises:
- a first current detector used to detect the second output current value of the second converter;
- a first comparator used to generate a fourth current reference value in accordance with the difference between the first current reference value and the second output current value of the second power converter; and
- an adder used to add the fourth current reference value and the third current reference value together to generate the second current compensation value.

31. The power system as claimed in claim 18, wherein the sharing voltage is the average of the input voltages of the power converters multiplied by a plurality of weighted values.

32. The power system as claimed in claim 18, wherein the power source is a manpower generator, a solar cell, a fuel cells, a wind-power generator, a thermal-power generator, a water-power generator, a electric power generator and a electric cell.

33. A power system, comprising:
- a voltage sharing bus used to transmit a sharing voltage;
- a first power supply unit used to provide power to a loading, wherein the first power supply unit comprises:
  - a first power converter electrically connected to a first power source and the loading, wherein the first power converter comprises a first current output terminal and a first voltage reverence terminal, and the first current output terminal is electrically connected to the loading;
  - a first resistor electrically connected to a first input terminal of the first power converter; and
  - a first comparator used to generate a first voltage compensation value in accordance with the difference between the sharing voltage and a first input voltage of the first power converter, wherein the first comparator is electrically connected to the second resistor and the input terminal, and one end of the voltage sharing bus is electrically connected between the first resistor and the first comparator;
  - wherein the first power converter adjusts a first output voltage thereof in accordance with the first voltage compensation value;
- a second power supply unit used to provide power to the loading, wherein the second power supply unit comprises:
  - a second power converter electrically connected to a first power source and the loading, wherein the second power converter comprises a second current output terminal and a second voltage reverence terminal, the second current output terminal is electrically connected to the first voltage reference terminal;

a second resistor electrically connected to a second input terminal of the second power converter; and a second comparator used to generate a second voltage compensation value in accordance with the difference between the sharing voltage and a second input voltage of the second power converter, wherein the second comparator is electrically connected to the second resistor and the second input terminal, and another end of the voltage sharing bus is electrically connected between the second resistor and the second comparator;

wherein the second power converter adjusts a second output voltage thereof in accordance with the second voltage compensation value.

34. The power system as claimed in claim 33, wherein the power system further comprises:

at least one third power supply unit electrically connected between the first power supply unit and the second power supply unit to provide power to the loading, wherein the third power supply unit is electrically connected to the voltage sharing bus, and adjusts a third output voltage thereof in accordance with the sharing voltage.

35. The power system as claimed in claim 33, wherein the sharing voltage is the average of the input voltages of the power converters multiplied by a plurality of weighted values.

36. The power system as claimed in claim 33, wherein the power source is a manpower generator, a solar cell, a fuel cells, a wind-power generator, a thermal-power generator, a water-power generator, a electric power generator and a electric cell.

* * * * *